United States Patent [19]
Beard

[11] Patent Number: 5,773,159
[45] Date of Patent: Jun. 30, 1998

[54] MULTICELL CONFIGURATION FOR LITHIUM CELLS OR THE LIKE

[76] Inventor: Paul Beard, 1657 Country Club Dr., Milpitas, Calif. 95035

[21] Appl. No.: 687,007

[22] Filed: Jul. 18, 1996

Related U.S. Application Data

[60] Provisional application No. 60/001,499 Jul. 18, 1995.
[51] Int. Cl.$^6$ ................................................ H01M 10/44
[52] U.S. Cl. ............................... 429/7; 429/50; 320/17
[58] Field of Search ........................... 429/7, 50; 320/17

[56] References Cited

U.S. PATENT DOCUMENTS

| | | | |
|---|---|---|---|
| 4,179,647 | 12/1979 | Cummins et al. | 320/17 X |
| 4,622,508 | 11/1986 | Matteau et al. | 320/17 X |
| 5,480,734 | 1/1996 | Schulz et al. | 429/7 |
| 5,547,775 | 8/1996 | Egushi et al. | 429/7 |

*Primary Examiner*—Stephen Kalafut
*Attorney, Agent, or Firm*—Suiter & Associates PC

[57] ABSTRACT

A battery pack is comprised of multiple lithium cells electrically connected in series. The voltage mismatch between the multiple lithium cells of the battery pack is balanced by utilization of an operational amplifier in conjunction with multiple series resistors having equal resistance values. The problems inherent with utilizing multiple lithium type cells in a series configuration is thereby eliminated. The multicelled battery pack may be charged in any desired fashion.

30 Claims, 1 Drawing Sheet ance of portable electronic devices has resulted in a widespread industry preference for battery packs composed of multiple electrochemical cells connected in series.

MULTICELL CONFIGURATION FOR LITHIUM CELLS OR THE LIKE

CROSS REFERENCE TO RELATED APPLICATIONS

The present application claims the benefit under 35 U.S.C.§119(e) of U.S. Application Ser. No. 60/001,499 filed Jul. 18, 1995.

TECHNICAL FIELD

The present invention relates generally to lithium electrochemical cells and specifically to a multicell configurations of series connected lithium cells or the like.

BACKGROUND OF THE INVENTION

Portable electronic devices have made great advances in increased power and utility. Applications of portable electronic devices such as portable data collection and processing terminals often require the operator to be mobile and roaming such that the portable electronic device must be powered by a reusable self-contained power supply which typically is some form of rechargeable battery pack. Rechargeable battery systems commonly employ nickel-cadmium or lead-acid electrochemical cells which perform well in most applications but have certain disadvantages when portability is considered. For a given battery capacity, these type of cells are relatively heavy.

Demand for batteries with higher energy densities and lower costs is fueling the search for alternatives to traditional nickel-cadmium or lead-acid electrochemical cells. For example, Nickel-metal hydride electrochemical cells have greater energy densities than nickel-cadmium cells but are correspondingly more expensive. Zinc-air cells offer greater energy densities as well but cannot be rapidly charged and have shorter operational life spans. Lithium cells are well suited to applications requiring low current draw for extended periods of time, and are relatively inexpensive.

Lithium batteries have not been widely utilized in the portable electronics industry because of inherent characteristics of lithium electrochemical cells. Lithium electrochemical cells are susceptible to self-discharge due to the internal presence of hydrogen in the electrochemical cells. When a battery pack comprises multiple series connected lithium cells, the voltages of the cells are typically mismatched due to the varying presence of internal hydrogen. This voltage mismatch causes the battery pack voltage to be lower than its nominal value and results in rapid loss of electric charge. During charging of the battery, the charging process may completely charge some of the cells and completely discharge other cells. The mismatched cells ultimately fail and thereby cause the instability and premature failure of the battery pack. Additionally, because some of the lithium cells are completely charged while others are discharged, the resulting total series voltage of the lithium cells is less than the nominal fully charged voltage of the battery back thereby causing the battery pack to be overcharged. Overcharging of the battery pack ultimately leads to premature failure and may possibly result in a fire or explosion of the electrochemical cells.

It is for these mentioned reasons that lithium electrochemical cells are often utilized only in single cell applications such as cameras, watches or computer memory backup. Often, the lithium electrochemical cell suppliers refuse to supply lithium electrochemical cells to portable electronic device manufacturers when the cell supplier believes the manufacturer will utilize the lithium cells in a series connection application. If lithium cells are desired to be utilized in a series connection application, the solution typically is to individually charge each lithium cell to ensure that each cell is fully and properly charged such that no overcharging or self-discharging occurs. This process is complex and requires that the charging process is carefully monitored and controlled so that there is no voltage mismatch between each of the individual cells. The battery pack requires complicated construction such that each of the cells may be electrically connected in series when the battery is utilized and electrically unconnected while being charged and monitored.

Pearce, U.S. Pat. No. 5,028,499 teaches the arrangement of multiple series connected lithium cells to prevent imbalanced charging of rechargeable batteries. Pearce teaches in the direction of providing a rechargeable lithium battery wherein the cells of the battery are constructed so that they are in a common atmosphere, and further teaches means to add and remove hydrogen from the cells in order to obtain equalization of the internal hydrogen and balance of the cells. However, Pearce requires a battery of lithium cells specially constructed to have each cell open to a common manifold or interconnected with a network of pipes between each of the cells for the transfer of hydrogen between the cells. Pearce further requires a means to monitor the charge on each cell to detect cell imbalances and means by which hydrogen is added to the cells when the charges are out of balance to the point of resulting in self-discharge. This type of battery is ultimately requires complex and expensive manufacture.

SUMMARY OF THE INVENTION

It is an object of the present invention to provide a simple, inexpensive and effective method and apparatus for enabling lithium electrochemical cells or the like to be connected, charged, utilized and recharged in a series connection configuration.

It is a further object of the present invention to avoid the need for the sophisticated monitoring systems that were necessary with prior methods of and means for charging lithium batteries known in the art.

It is yet another object of the present invention to eliminate the need for complex cell and battery construction required in the prior art to balance the internal hydrogen levels of the lithium cells.

The present invention provides a method and apparatus for ensuring lithium cell balancing at all times during the utilization and charging of a multiple cell series connection configuration.

An exemplary embodiment of the present invention provides a two cell lithium battery pack having series connected lithium cells.

BRIEF DESCRIPTION OF THE DRAWINGS

The numerous objects and advantages of the present invention may be better understood by those skilled in the art by reference to the accompanying figures in which.

DETAILED DESCRIPTION OF AN EXEMPLARY EMBODIMENT

Figure 1:
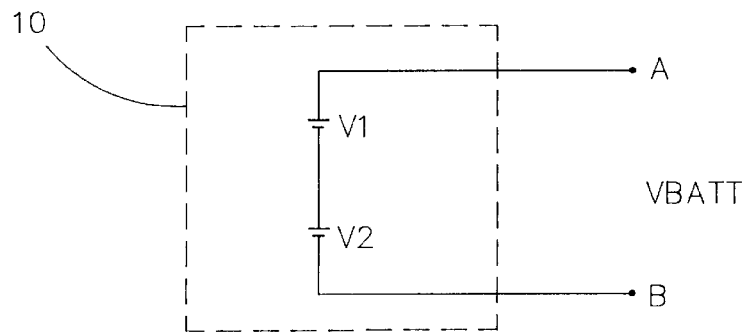
FIG. 1 illustrates a typical multicell configuration comprising a battery.

FIG. 1 is an illustration of a typical multicell configuration comprising a battery. A battery is typically known in the art as a combination of multiple individual electrochemical cells. Multiple electrochemical cells may be combined into a larger battery unit to provide greater direct current voltage output and greater capacity than an individual electrochemical cell is capable of providing. The battery 10 typically may comprise two electrochemical cells V1 and V2 electrically connected in series. The negative terminal of cell V1 may be connected to the positive terminal of cell V2 such that the positive terminal of cell V1 comprises the positive terminal A of the battery 10 and the negative terminal of cell V2 comprises the negative terminal B of the battery 10. The net result under Kirchoffs voltage law is that the resulting battery output voltage VBATT is equal to the algebraic sum of the output voltages of cell V1 and cell V2.

The capacity of an electrochemical cell is the amount of electrical charge that the cell is capable of storing, conventionally measured in current-time in the units of ampere-hours or milliampere-hours. The capacity of battery 10 is equal to the sum of the capacities of the individual cells V1 and V2 which the battery 10 comprises. Battery capacity indicates the duration of time over which a battery is capable of drawing a given amount of current.

Figure 2:
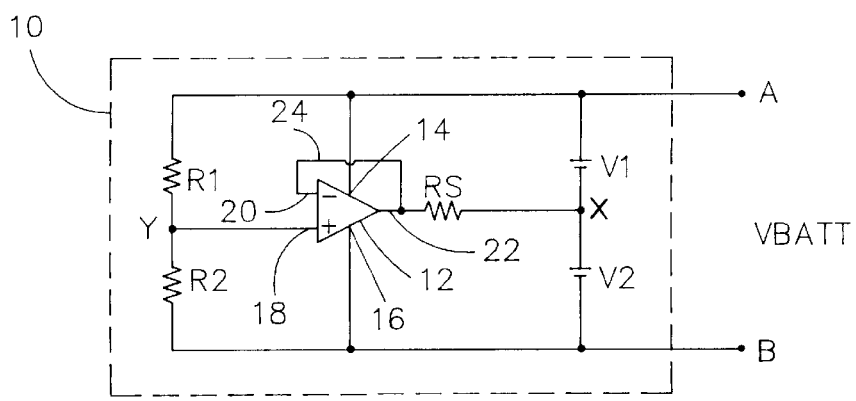
FIG. 2 depicts an exemplary embodiment of a multicelled battery of the present invention.

FIG. 2 is an illustration of an exemplary embodiment of the circuit of the present invention. The battery circuit 10 preferably includes two series connected electrochemical cells V1 and V2 which are arranged in a manner essentially similar to the arrangement of cells V1 and V2 of the battery 10 of FIG. 1.

The series connection of the electrochemical cells is a standard configuration when it is desired to increase the overall battery output voltage VBATT above the output voltage of the individual cells V1 and V2 which comprise the battery 10. The overall battery output voltage VBATT across terminals A and B is equal to the sum of the output voltages of individual cells V1 and V2. Typically, the cells V1 and V2 may be of a rechargeable variety such that the battery 10 may be recharged when the capacity of the cells V1 and V2 is depleted by applying an electrical charging current to the terminals A and B of the battery 10. Recharging of the battery 10 restores the depleted electrochemical cells V1 and V2 with the charge lost from the cell due to normal use of the battery, for example.

Typical multicell rechargeable batteries utilize nickel-cadmium (NiCad) electrochemical cells. Recent advances in battery technology have resulted in the utilization of nickel-metal-hydride (NiMH) electrochemical cells which exhibit more favorable characteristics than that of nickel-cadmium cells. A typical NiCad cell may be recharged 400 times over the life of the battery before requiring replacement and may have an energy density on the order of 25 watt-hours per pound. The energy density of a battery, the amount of energy a battery is capable of holding for a given unit mass or weight, defines the overall weight, size and energy output of a given battery. A typical NiMH battery may be recharged 600 times over the life of the battery and may have an energy density on the order of 35 watt-hours per pound. Lithium (Li) and lithium ion (Li ion) batteries, however, may be recharged 1000 times over the life of the battery and have an energy density of 70 watt-hours per pound. Additionally, a typical lithium electrochemical cell will have an output voltage three (3) times higher than the output voltage of a typical NiCad cell and one-and-one half (1.5) times higher than the output voltage of a typical NiMH cell. Because lithium batteries exhibit higher power and voltage outputs for a given size and weight than typical nickel-cadmium and nickel-metal-hydride cells, they are lighter and run longer on a single charge. Thus, lithium batteries are ideally suited for utilization as the batteries of powerful portable electronic equipment.

Another reason that lithium batteries are ideally utilized in portable electronic equipment and considered the next advance over nickel-metal-hydride cells is that lithium cells do not suffer from the memory effect which nickel-cadmium and nickel-metal hydride batteries exhibit. The memory effect commonly associated with rechargeable batteries refers to the phenomenon occurring when NiCad or NiMH batteries are recharge before being fully completely depleted of the stored charge or when the batteries are overcharged. The memory effect, or hysteresis, may occur, for example, when a battery is continuously recharged from a shallow discharge such that the battery appears as if though it has been completely discharged by producing a low output voltage even though its full capacity has not been utilized. The battery in effect has a "memory" of the capacity from which it was previously charged such that it will not utilize remaining battery capacity beyond the unutilized capacity associated with previous recharge cycles.

One of the major problems associated with utilizing lithium cells in a multicell series configured battery is the voltage mismatch between the output voltages of the cells. Typically, the output voltage of individual lithium cells such as cells V1 and V2 may be 3.6 volts per cell and may reach up to 4.2 volts per cell such that two cells in series comprise a battery having a nominal voltage of 7.2 volts or 8.4 volts, for example. However, the output voltage of individual lithium cells may vary as much as 20 or 30 millivolts between the cells which is on the order of a 10 percent difference in voltage. When a battery such as battery 10 of FIG. 2 comprising two series connected lithium cells V1 and V2 is charged wherein a voltage mismatch exists between cells V1 and V2, the cell with the greater voltage may become completely charged while the cell with the lesser voltage may become discharged, or "flat." Thus, the total battery output voltage VBATT will be equal only to the sum of the completely charged cell, 4.2 volts for example, and the discharged cell, which may be 3 volts, for example. Because VBATT would then be only 7.2 volts, less than the nominal value of 8.4 volts for example, the battery charger will continue to charge the battery 10 because a voltage less than the nominal value normally indicates that the battery 10 is not fully charged, so charging of the battery 10 continues. This causes the fully charged cell to be overcharged and thereby damaged. Similar problems also occur during the utilization of a lithium battery having mismatched cell output voltages.

The solution of the present invention as embodied in the circuit of FIG. 2 is to balance the voltage on the individual cells such that whenever the output voltages of the individual cells become mismatched the voltage mismatch is corrected. The voltage mismatch correction process essentially comprises sourcing or sinking current into or from the electrical node formed between two series connected lithium cells. Essentially, it is desired that the two lithium cells V1 and V2 always have the same output voltage value independent of the state of charge of the cells. Thus, the two individual cells V1 and V2 ideally should electrically behave as if they were two equal valued resistors such that the node X between the two cells V1 and V2 is always at a voltage equal to one half the total output voltage of cells V1 and V2.

The solution of the present invention as illustrated in FIG. 2 is to utilize an operational amplifier 12 in conjunction with two equal valued resistors R1 and R2 in order ensure that the voltage at the node X between the two cells V1 and V2 is always equal to one half of the total voltage of the two cells. It is thereby possible to utilize two or more lithium cells in a series configured battery without concern for the problems normally associated therewith. The output voltages of the individual cells V1 and V2 may be corrected and balanced so that the battery 10 may be charged in any desired fashion.

An operational amplifier such as the amplifier 12 of FIG. 2 normally has a positive supply terminal 14, a negative supply terminal 16, a noninverting (or positive) input terminal 18, an inverting (or negative input terminal) 20, and an output terminal 22. The operational amplifier circuit was originally designed to be utilized as the basic building block in analog computers. Today, the utilization of the operational amplifier has increased beyond performing analog mathematical computation, and it is commonly referred to as an "op amp." The operational amplifier 12 of FIG. 2 may be a Fairchild Semiconductor μA741 operational amplifier, for example.

An operational amplifier is a single-ended output amplifier having differential inputs. The ideal operational amplifier is characterized as having infinite gain, infinite input resistance an zero output resistance. In a typical operational amplifier circuit application, an ideal operational amplifier exhibits a summing point constraint wherein the difference between the voltage at the inverting terminal 20 and the noninverting terminal 18 is always zero. Thus, when a feedback loop 24 is utilized connecting the output terminal 22 to an input terminal such as the inverting terminal 20, the operational amplifier 12 will source or sink current through the output terminal 22 in order to equalize the difference between the voltages at input terminals 18 and 20 in order to satisfy the summing point constraint such that the voltage difference between terminals 18 and 20 is always zero volts.

Thus, the battery circuit 10 of FIG. 2 ensures that any mismatch between the output voltages of cells V1 and V2 is always eliminated. Cells V1 and V2 connected in series comprise the overall output voltage VBATT of the battery 10 having a positive output terminal A and a negative output terminal B. The positive supply terminal 14 of the op amp 12 preferably couples to the positive battery terminal A, and the negative supply terminal 16 of the op amp 12 preferably couples to the negative battery terminal B such that the op amp 12 is preferably powered by the cells V1 and V2 of the battery 10. The output terminal 22 of the op amp 12 preferably couples with the node X formed between the two series connected cells V1 and V2 via a series connected shock resistor RS. The output terminal 22 preferably feeds back into the inverting input 20 of the op amp 12 via feedback path 24. Two equal valued resistors R1 and R2 are connected in series across the positive and negative battery terminals A and B respectively, and the node Y formed between resistors R1 and R2 is preferably coupled to the noninverting terminal 18 of the op amp 12.

The values of resistors R1 and R2 are preferably relatively large with respect to the effective internal resistance values of cells V1 and V2 such that relatively little current will flow through resistors R1 and R2. The effective internal resistance value of an electrochemical cell is typically on the order of a few hundredths of an ohm. In a preferred embodiment of the present invention, R1 and R2 both have 1 MΩ resistance values. Because R1 is equal to R2, the voltage at node Y between the resistors R1 and R2 is always one half the total voltage applied across them. Since the voltage applied across resistors R1 and R2 is the total of the output voltages of cells V1 and V2, the voltage at node Y is always equal to one half of the total voltage of cells V1 and V2. Thus, the voltage at the noninverting input terminal 18 of the op amp 12 is always equal to one half the total voltage of cells V1 and V2 independent of the actual present individual output voltage and capacity values of cells V1 and V2.

The operational amplifier circuit configuration of FIG. 2 is essentially a noninverting amplifier circuit. Because there is no resistance in feedback path 24, the voltage at the output terminal 22 of the op amp 12 is ideally equal to the input voltage value at the noninverting terminal 18 of the op amp 12 which is ideally always one half of the total output voltage of cells V1 and V2. Thus, the operational amplifier 12 will act to hold the voltage at the output terminal 22 of the operational amplifier 12 to always equal to the voltage at node Y.

If there is any mismatch in the output voltages of cells V1 and V2, the voltage at node X will be some value other than one half of the total voltage values of cells V1 and V2. When the output voltage of cell V2 falls to a value below the output voltage of cell V1, the voltage at node X will be less than the voltage at node Y appearing at the noninverting input terminal 18 of op amp 12. Under this condition op amp 12 will push current into node X such that the voltage of cell V2 is thereby increased and the voltage of cell V1 is thereby decreased such that the voltage at node X is increased to equal the voltage at node Y. When the output voltage of cell V2 rises to a value above the output voltage of cell V1, the voltage at node X will be greater than the voltage at node Y appearing at the noninverting terminal 18 of op amp 12. Under this condition op amp 12 will pull current out of node X such that the voltage of cell V2 is thereby decreased and the voltage of cell V1 is thereby increased such that the voltage at node X is decreased to equal the voltage at node Y.

When the voltage of cell V1 is equal to the voltage of cell V2, the voltage at node X will equal the voltage at node Y which is equal to one half of the total voltage of cells V1 and V2. Under this condition, the op amp 12 will neither push nor pull current. The shock resistor RS preferably has a value of 200Ω in an exemplary embodiment of the present invention and functions to prevent instantaneous changes in current flow into or out of node X which may shock or damage the electrochemical cells V1 and V2. Alternatively, the shock resistor RS may comprise or include a reactive element such as an inductor, for example.

The battery 10 shown in FIG. 2 and described under the discussion of FIG. 2 may comprise a battery pack preferably to be utilized in portable electronic equipment such as a portable hand held data terminal. In an exemplary embodiment of the present invention, such a battery pack 10 comprise two lithium electrochemical cells V1 and V2 preferably providing a total output voltage VBATT of 8.4 volts. The battery 10 preferably has a capacity of 1200 milliampere-hours when fully charged and may preferably undergo a minimum of 800 recharge cycles over its entire useful life. The exemplary battery pack 10 preferably may provide up to 1.5 amperes of current. A preferred embodiment of the present invention preferably utilizes Panasonic VL 3032 vanadium lithium cells.

The present invention contemplates utilizing more two or more electrochemical cells connected in series. It is now apparent to one of ordinary skill in the art to extrapolate the invention as described in the discussion of FIG. 2 and as illustrated in FIG. 2 to obtain a multicell battery having a given number n electrochemical cells electrically connected in series using the given number n equal series connected resistors corresponding to resistors R1 and R2, and utilizing n-1 operational amplifiers and n-1 shock resistors. An exemplary multicell battery according to this embodiment of the invention is illustrated in FIG. 3.

Figure 3:
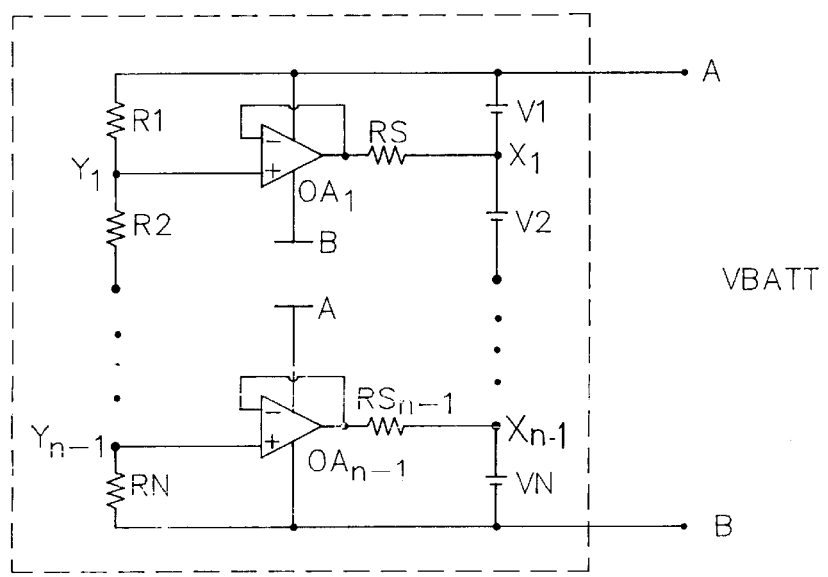
FIG. 3 illustrates an embodiment of a multicelled battery of the present invention having n cells.

Referring now to FIG. 3, a generalized form of the invention of FIG. 2 is shown for the general case of a battery comprising n cells. As shown in reference to FIGS. 2 and 3, a battery comprising n cells (V1-VN) has n-1 intermediate nodes ($X_n$–$X_{n-1}$) each disposed between a pair of adjacent cells. Further, n resistors (R1-RN) may be utilized such that there are n-1 intermediate nodes ($Y1$–$Y_{n-1}$) each disposed between a pair of adjacent resistors. Additionally, n-1 operational amplifiers ($OA_1$–$OA_{n-1}$) are utilized, each of which being operably connected between a pair of corresponding nodes, $Y1$–$Y_{n-1}$ and $X1$–$X_{n-1}$, respectively. Lastly, n-1 shock resistors ($RS$–$RS_{n-1}$) may be utilized, each being connected between a corresponding operational amplifier $OA_1$–$OA_{n-1}$ and a corresponding cell node ($X1$–$X_{n-1}$). As can be realized from the general case shown in FIG. 3 extrapolated from the two cell embodiment of FIG. 2, the voltage across each of the cells is maintained at 1/n of the total voltage appearing between terminals A and B.

In view of the above detailed description of a preferred embodiment and modifications thereof, various other modifications will now become apparent to those skilled in the art. The contemplation of the invention below encompasses the disclosed embodiments and all reasonable modifications and variations without departing from the spirit and scope of the invention.

What is claimed is:

1. A multicell battery having positive and negative terminals wherein the voltage of the cells is equalized comprising:
   (a) at least two electrochemical cells electrically connected in series, each of said cells having positive and negative terminals such that the positive terminal of a first of said electrochemical cells comprises the positive terminal of the battery, the negative terminal of a second of said electrochemical cells comprises the negative terminal of the battery and a node is formed by the connection of the negative terminal of said first cell to the positive terminal of said second cell;
   (b) at least one operational amplifier having positive and negative input terminals, positive and negative supply terminals and an output terminal, the output terminal being coupled to the negative input terminal, the positive supply terminal being coupled to the positive battery terminal, the negative supply terminal being coupled to the negative battery terminal;
   (c) means for coupling the output terminal of said at least one operational amplifier to the node formed between said first and said second electrochemical cells; and
   (d) at least two equal valued resistors electrically connected in series across the positive and negative terminals of the battery such that a node is formed between said at least two resistors, said node being electrically connected to the positive terminal of said at least one operational amplifier.

2. The multicell battery according to claim 1 wherein said at least two electrochemical cells are lithium cells.

3. The multicell battery according to claim 1 wherein said at least two electrochemical cells are lithium ion cells.

4. The multicell battery according to claim 1 wherein said at least two electrochemical cells are nickel-cadmium cells.

5. The multicell battery according to claim 1 wherein said at least two electrochemical cells are nickel-metal-hydride cells.

6. The multicell battery according to claim 1 wherein said at least two electrochemical cells are zinc-air cells.

7. The multicell battery according to claim 1 wherein said at least two electrochemical cells are lead-acid cells.

8. The multicell battery according to claim 1 wherein said means for coupling the output terminal of said at least one operational amplifier to the node formed between said first and said second electrochemical cells comprises a shock resister connected in series between said output terminal of said operational amplifier and said node.

9. A multicell battery having positive and negative terminals wherein the voltage of the cells is equalized comprising:
   (a) first and second electrochemical cells electrically connected in series, each of said cells having positive and negative terminals such that the positive terminal of said first electrochemical cell comprises the positive terminal of the battery, the negative terminal of said second electrochemical cells comprises the negative terminal of the battery and a node is formed by the connection of the negative terminal of said first cell to the positive terminal of said second cell;
   (b) an operational amplifier having positive and negative input terminals, positive and negative supply terminals and an output terminal, the output terminal being coupled to the negative input terminal, the positive supply terminal being coupled to the positive battery terminal, the negative supply terminal being coupled to the negative battery terminal;
   (c) means for coupling the output terminal of said operational amplifier to the node formed between said first and said second electrochemical cells; and
   (d) first and second resistors electrically connected in series across the positive and negative battery terminals such that a node is formed between said first and said second resistors, said node being electrically connected to the positive terminal of said operational amplifier.

10. The multicell battery according to claim 9 wherein said first and second electrochemical cells are lithium cells.

11. The multicell battery according to claim 9 wherein said first and second electrochemical cells are lithium ion cells.

12. The multicell battery according to claim 9 wherein said first and second electrochemical cells are nickel-cadmium cells.

13. The multicell battery according to claim 9 wherein said first and second electrochemical cells are nickel-metal-hydride cells.

14. The multicell battery according to claim 9 wherein said first and second electrochemical cells are zinc-air cells.

15. The multicell battery according to claim 9 wherein said first and second electrochemical cells are lead-acid cells.

16. The multicell battery according to claim 9 wherein said means for coupling the output terminal of said operational amplifier to the node formed between said first and said second electrochemical cells comprises a shock resister connected in series between said output terminal and said node.

17. In a multicell battery having series connected electrochemical cells, a process of equalizing the voltage the cells of the battery comprising:
   (a) sourcing current into each node formed between two adjacent cells when the voltage at the node is less than one half value of the sum of the output voltages of the two adjacent cells relative to the most negative terminal of the two adjacent cells until the voltage at the node is thereby increased to equal one half the sum of the output voltages of the two adjacent cells relative to the most negative terminal of the two adjacent cells; and (b) sinking current from each node formed between two adjacent cells when the voltage at the node is greater than one half value of the sum of the output voltages of the two adjacent cells relative to the most negative terminal of the two adjacent cells until the voltage at the node is thereby decreased to equal one half the sum of the output voltages of the two adjacent cells relative to the most negative terminal of the two adjacent cells.

18. A circuit for maintaining series connected cells in balance while charging or while discharging, comprising:

a reference circuit for providing a reference voltage; and an amplifier receiving the reference voltage and being connected to the series connected cells at an intermediate node between the series connected cells such that the voltage at the intermediate node is maintained at the reference voltage.

19. A circuit as claimed in claim 18, wherein said reference circuit comprises a divider network.

20. A circuit as claimed in claim 18, wherein said reference circuit comprises a resistor divider network.

21. A circuit as claimed in claim 19, wherein said divider network comprises equal valued resistors.

22. A circuit as claimed in claim 19, wherein said resistor divider network comprises resistors having values an order of magnitude greater than the impedance of the series connected cells.

23. A circuit as claimed in claim 19, wherein said resistor divider network comprises resistors having values greater than the impedance of the series connected cells.

24. A circuit as claimed in claim 19, wherein said amplifier has a pair of inputs, the first input being connected to the reference voltage and the second input being connected to the intermediate node.

25. A circuit as claimed in claim 18, wherein said amplifier has a pair of differential inputs, the first differential input being connected to the reference voltage and the second differential input being connected to the intermediate node.

26. A circuit as claimed in claim 18, wherein said amplifier is an operational amplifier having a pair of inputs, the first input being connected to the reference voltage and the second input being connected to the intermediate node.

27. A circuit as claimed in claim 18, further comprising an impedance element connected from the amplifier to the intermediate node.

28. A circuit as claimed in claim 27, wherein said impedance element comprises an inductor.

29. A circuit as claimed in claim 27, wherein said impedance element comprises a resistor.

30. A circuit as claimed in claim 27, wherein said impedance element comprises a capacitor.

* * * * *